United States Patent
Cort

(10) Patent No.: US 6,228,269 B1
(45) Date of Patent: May 8, 2001

(54) METHODS FOR TREATING WASTEWATER CONTAINING HARD-TO-FILTER SOLIDS, IN PARTICULAR PHOTORESIST AND PAINT SLUDGES

(76) Inventor: Steven Cort, 411 Bathgate La., Cary, NC (US) 27513

( * ) Notice: Subject to any disclaimer, the term of this patent is extended or adjusted under 35 U.S.C. 154(b) by 0 days.

(21) Appl. No.: 09/421,071

(22) Filed: Oct. 19, 1999

(51) Int. Cl.⁷ ....................................................... C02F 1/50
(52) U.S. Cl. .............................. 210/710; 95/152; 134/38; 210/724; 210/25; 210/717; 210/726; 210/908; 210/912; 210/930
(58) Field of Search ................................ 95/152; 134/38; 210/710, 712, 717, 723, 724, 725, 726, 727, 728, 729, 930, 908, 912

(56) References Cited

U.S. PATENT DOCUMENTS

| | | | |
|---|---|---|---|
| 3,740,331 | 6/1973 | Anderson et al. | 210/726 |
| 4,067,806 * | 1/1978 | Mauceri | 210/930 |
| 4,294,617 * | 10/1981 | Schlicklin et al. | 134/38 |
| 4,656,059 * | 4/1987 | Mizuno et al. | 210/729 |
| 4,701,220 * | 10/1987 | Seng | 106/203 |
| 4,760,014 * | 7/1988 | Wong | 430/399 |
| 4,857,206 * | 8/1989 | Choo | 210/709 |
| 5,114,591 | 5/1992 | Patzelt et al. | 210/663 |
| 5,143,624 * | 9/1992 | Morse | 210/712 |
| 5,250,189 | 10/1993 | Rey | 210/712 |
| 5,302,291 | 4/1994 | Miknevich | 210/496 |
| 5,308,502 * | 5/1994 | Brown | 210/724 |
| 5,372,726 | 12/1994 | Straten | 210/728 |
| 5,451,327 | 9/1995 | Straten | 210/716 |
| 5,719,224 | 2/1998 | Agree et al. | 524/437 |
| 5,730,881 | 3/1998 | Miknevich | 210/696 |
| 5,762,807 | 6/1998 | Straten | 210/716 |
| 5,800,718 * | 9/1998 | Gaudette | 210/714 |
| 5,830,315 | 11/1998 | Mitchell et al. | 210/930 |
| 5,843,337 | 12/1998 | Mitchell et al. | 210/708 |

\* cited by examiner

*Primary Examiner*—Peter A. Hruskoci
(74) *Attorney, Agent, or Firm*—Michael de Angeli

(57) ABSTRACT

Wastewater streams containing tacky or sticky components and heavy metals, such as photoresist-containing streams from printed-circuit board manufacture and water streams from paint spraying processes, can be detackified and the metals simultaneously removed by addition of a metal salt, such as an iron salt, and a sulfide material. The combination of metal salts and sulfide reacting products produces a detackified metal sulfide sludge that improves the filterability of the wastewater while also removing dissolved metal ions from the wastewater.

16 Claims, No Drawings

US 6,228,269 B1

METHODS FOR TREATING WASTEWATER CONTAINING HARD-TO-FILTER SOLIDS, IN PARTICULAR PHOTORESIST AND PAINT SLUDGES

FIELD OF THE INVENTION

This invention relates to removal of contaminants from water. More specifically, the invention pertains to methods of treating contaminated water resulting from common industrial operations, in particular, for coagulating suspended matter in wastewater, precipitating dissolved heavy metals, and detackifying sticky suspended solids in the wastewater.

Still more particularly, this invention relates to treatment of wastewater through the use of a combination of metal salts and sulfide products to produce metal sulfide precipitates. These finely dispersed precipitates detackify sticky suspended solids such as photoresist polymers, aqueous and/or solvent-based paint overspray particles, pitch particles, and the like, de-emulsify oil-in-water aqueous systems when operated in an acid pH, and remove heavy metal ions from the wastewater.

BACKGROUND OF THE INVENTION

The removal of matter suspended in wastewater is an important aspect of industrial wastewater treatment. The final step of removal is usually filtration. To be successful, the solid matter to be filtered must exhibit good "filterability"; among other characteristics, filterability requires that the material not be sticky or tacky, i.e., that the solid particles not adhere to one another. Many methods have been proposed and used for "detackification" of materials that are otherwise hard to filter.

For example, in the printed circuit board industry, a dry film polymer is commonly used as a "photoresist" mask in the printed circuit board patterning and etching process. When rinsed, this photoresist material eventually becomes a constituent of an aqueous wastewater stream that usually also contains amounts of dissolved copper, tin, and sometimes lead. Traditional treatment of this wastewater first entails the addition of a detackifier that is usually an aluminum-based product, followed by acidification to below 5.0, in order to precipitate the aqueous polymer. The resulting precipitate is tacky and would be very difficult to filter if not for the aluminum detackifier, which forms an aluminum hydroxide precipitate that coats the tacky polymer.

If the filtrate contains unacceptable levels of copper and lead, a further metal precipitant that is functional at a pH of less than 5.0, normally a sulfide, is usually added. For example, U.S. Pat. No. 3,740,331 to Anderson discloses using sulfides in combination with iron to remove heavy metals from wastewater. However, Anderson does not suggest that such treatments could be used at high concentrations in order to detackify sludges and thereby improve their filterability. Moreover, most inorganic sulfides will generate hydrogen sulfide in this use, while some organic sulfides will generate carbon disulfide; both hydrogen sulfide and carbon disulfide are very toxic gases, and hazardous to workers. There are few precipitants suitable for this application. One product sold for this purpose is a Degussa product known as "TMT-15"; this is an organic sulfide, trimercaptotriacene, that is added at dosages on the order of 5000 ppm.

Commonly assigned U.S. Pat. Nos. 5,451,327 and 5,372,726, incorporated herein by this reference, disclose sulfide compositions that are extremely well suited for this application, because use of these compositions in this process provides the desired precipitation without emission of hydrogen sulfide.

However, even if the sulfide compositions disclosed by commonly assigned U.S. Pat. Nos. 5,451,327 and 5,372,726 are used to precipitate the metals in the photoresist-containing wastewater stream, the use of an aluminum salt as a detackifying agent has several further and inherent disadvantages. At a pH of 5.0, a significant amount of the aluminum re-dissolves and is discharged with the filtrate, possibly violating discharge limits. Further, the aluminum produces an aluminum hydroxide floc that is hydroscopic and difficult to dewater, adding significantly to the amount of sludge for disposal. The encapsulated water also slows the filtration time, increasing labor and capital equipment costs.

Proprietary powdered materials, such as those sold by the Morton Chemical Company under the trade name Dynachem, are also used to detackify photoresist wastewater. These materials, which are believed by the present inventor to contain aluminum, but are not otherwise defined, are added at an alkaline pH and then acidified to flocculate the aqueous photoresist polymer. However, these powdered materials do not remove metals to desired levels, are dusty to use, and produce large volumes of sludge, which are slow to filter.

A treatment process for photoresist wastewater which not only detackified the suspended solids but also removed the dissolved metals would provide a major benefit, particularly if the photoresist wastewater treatment process resulted in reduced sludge quantities and filtration times.

Under some circumstances it is not necessary to remove the photoresist polymer from the wastewater stream. More particularly, certain circuit board manufacturing facilities would be permitted by local regulation to discharge wastewater comprising photoresist polymer directly to the local Publicly Owned Treatment Works ("POTW") along with other water streams including biodegradable organic substances ("BOD" wastes), if the levels of copper and lead in their photoresist wastewater were sufficiently low. However, at present there is available no suitable method to precipitate and flocculate the copper and lead so that they can be removed by industrial filtration equipment. More particularly, the photoresist polymer prevents flocculation and "blinds" (i.e., clogs) any filter cloths fine enough to remove the copper and lead precipitates. It would be a major benefit to the printed circuit board industry if a photoresist wastewater treatment were provided capable of precipitating heavy metals, such that they could be removed by conventional filter "press" equipment without blinding the filter cloth.

A similar problem arises in connection with processing of wastewater streams resulting from commercial paint spraying operations as performed in spray booths. Regulations require the emissions of paint spray to be controlled, which is traditionally accomplished by spraying water into the paint "overspray" emissions. However, unless treated with detackifiers, particles of the usual solvent-based paints remain sticky and adhere to all surfaces in the treatment system. The sticky particles build up and become entrained in the spray booth water, which, if untreated, may cause plugging of piping and spray nozzles, thus reducing the efficiency of the spray booth operation and increasing its emission of volatile organic compounds ("VOCs"). Accordingly, a detackifying agent is normally used in the spray application of solvent-based paints such as polyurethanes, epoxy resins, lacquers, and enamels. The detackifying agents used in this service are typically based upon clays, amphoteric metals, polymers, or combinations of these.

By comparison, water-based paints are typically resin suspensions stabilized by a surfactant matrix; when mixed with the spray booth water, these materials disperse and/or emulsify, again resulting in an increase in both suspended and dissolved solids. While these solids must be coagulated and removed from the spray booth water in order to maintain an effective painting operation, these solids do not require detackification as required for organic solvent based paints. However, the solids in water-based paints nonetheless require agglomeration for effective removal from the system.

In both solvent-based and water-based paint systems, heavy metals (e.g., lead, copper, zinc, nickel, or chromium) may be provided for corrosion resistance, or may be contained in the paint pigments. Therefore, before discharge, these paint wastes may have to be treated with a metal precipitating agent to meet regulatory discharge limits. None of the present detackifying methods is effective in removing metals from the wastewater. For example, U.S. Pat. No. 5,843,337 to Mitchell discloses treatment of paint wastes using a chemically modified tannin. While possibly effective in coagulating and detackifying solid paint suspended in an aqueous system, this process does not remove heavy metals from the wastewater. Consequently, it would be a major benefit if a single water-treating process could both detackify and remove dissolved metals from the wastewater.

In some cases, both organic solvent-based paints and water-based paints are sprayed in the same paint spray booth. Since solvent based paints need detackification (a surface adsorption process), and waterborne paints need coagulation (a particle charge process), it would be a major benefit if a single water treating agent could both detackify and coagulate paint wastes of either type.

Water-based paints sometimes include oils that form further emulsions in the wastewater. These emulsions are sometimes difficult to break and therefore require an acidic treatment ("acid break") to separate the water from the oil. Availability of a water-treating agent capable of operation in an acid condition and having a high surface area to adsorb the separated oil would be a major benefit for processes operating under these conditions.

OBJECTS AND SUMMARY OF THE INVENTION

It is therefore an object of the invention to provide processes for treatment of waste water streams arising in typical printed-circuit board manufacturing and spray painting operations, and in other processes resulting in comparable wastewater streams.

According to the invention, a novel process is provided for treating difficult-to-filter suspended solids as found in various wastewaters. The process uses metal salts and sulfide products to produce a final precipitate of metal sulfides. This process detackifies, coagulates, flocculates, removes dissolved metals, and removes oily waste.

Metal sulfides are known for their fine particle size and large surface area. This quality makes metal sulfides an ideal detackifier; the fine metal sulfide particles are adsorbed onto the tacky surface of the suspended solids in the wastewater, resulting in a readily filterable sludge containing the metals.

According to the invention, sulfides, preferably including the compositions disclosed in U.S. Pat. Nos. 5,451,327 and 5,372,726, are used in combination with metal salts, preferably iron salts, to treat wastewater. Combinations of ferrous salts and sulfide compositions have not previously been used for simultaneous detackification and metal removal.

In a first "acid" embodiment of the invention, these materials are added in quantities that would be considered "overdoses" by the prior art; that is, quantities in excess of those needed simply to precipitate the metals are used. The combined effect of these two classes of chemicals, added in relatively large quantities according to the invention, is to make it possible to simultaneously remove metals from an acidified photoresist wastewater and detackify the resulting sludge, so that the water can be readily filtered from the sludge.

In some cases, it is permissible to discharge the polymer photoresist to the POTW. In such circumstances, the metal removal and detackification process is carried out at an alkaline pH of greater than 7.0, that is, without acidification. Where the polymer must also be removed from the wastewater stream, the stream is acidified to a pH of approximately 5.0; the polymer then precipitates out of the wastewater, forming a detackified sludge which can be conveniently filtered out of the water.

More specifically, and as mentioned above, wastewater from circuit board manufacturing operations is typically acidified to remove the waste photoresist polymer from solution. According to the present invention, whenever possible the photoresist is treated for metal removal while leaving the polymer in solution. This allows the treated waste to be discharged as biodegradable waste to the POTW. This reduces acid usage, eliminates aluminum detackifier usage, which eliminates the discharge of soluble aluminum, and reduces sludge disposal by over 90%. Moreover, in this second "alkaline" embodiment of the invention, the metal salts and sulfide compositions are added at relatively low dosages, reducing cost. As noted above, prior to this invention, it was impossible to precipitate the copper and lead out of the alkaline photoresist in large enough particles to permit filtering or settling to remove them from the wastewater.

The addition of the metal salts and sulfide compositions, preferably the sulfide compositions disclosed in U.S. Pat. Nos. 5,451,327 and 5,372,726, to photoresist-containing wastewater streams resulting from printed circuit board manufacturing processes according to the present invention provides a process effective in removing dissolved metal ions from the wastewater. Prior processes involve discharge of additional metals to the POTW, because other metal precipitants used are not as effective as the sulfide compositions disclosed in U.S. Pat. Nos. 5,451,327 and 5,372,726. This process can also be used in a strong acid condition to "acid break" oil emulsions, which is an important step in removing oil from wastewater. This invention provides many fine solids with large surface areas to effectively adsorb the oil released by the acid break. Furthermore, use of the sulfide compositions disclosed in U.S. Pat. Nos. 5,451,327 and 5,372,726 totally eliminates the emissions of hydrogen sulfide in acid conditions.

Use of a metal salt, preferably an iron salt, in combination with a suitable sulfide composition, again preferably the sulfide compositions disclosed in U.S. Pat. Nos. 5,451,327 and 5,372,726, results in the formation of fine dense precipitates that do not encapsulate water molecules. This factor provides two major benefits. The first benefit is that the detackified particles can be filtered out in less time. The second advantage is that less sludge is generated because less water is entrapped.

The ability of the process of the invention to effectively detackify, coagulate, flocculate, remove oily waste, and remove dissolved heavy metals from solution, also makes it ideal for treating paint wastes from paint spray booth operations. The process of the invention also applies to other difficult to treat suspended solids in wastewater.

Another advantage of the process of the invention is that dissolved heavy metals in the wastewater are converted into insoluble metal sulfides. The metal sulfides, particularly lead sulfide, are so insoluble that the sludge will pass the Environmental Protection Agency's Toxicity Characteristic Leachability Procedure (TCLP) and therefore can be disposed of as non-hazardous waste, a major advantage.

DETAILED DESCRIPTION OF THE INVENTION

The invention is of processes that can be used for treating wastewater to improve filterability, more particularly, to treat wastewater including suspended solids exhibiting a characteristic tackiness that makes it difficult to remove them from the wastewater with conventional filtration equipment.

The method of the invention involves the use of metal salts, preferably iron salts, in combination with sulfides, preferably the sulfide compositions described in U.S. Pat. Nos. 5,451,327 and 5,372,726, for processing of wastewater streams containing heavy metals and tacky products rendering filtering of precipitate sludges difficult. Such wastewater streams are encountered in circuit board manufacture, that is, photoresist-containing water streams, and from paint spraying operations. Where it is necessary to acidify a water stream, e.g., to precipitate polymer material out of the water stream, the metal salts and sulfides are added in relatively large dosages as compared to the teachings of the prior art; where the stream can be treated at neutral to alkaline pH levels, these constituents are added at relatively lower dosages.

The process of the invention is described in first "acid" and second "alkaline" embodiments, as follows. Test results comparing the efficacy of the "acid" process of the invention in processing a number of samples of photoresist-containing water streams with the known "aqueous aluminum salt" and "commercial powder" processes, and comparing the acid and alkaline processes to one another, are provided.

Embodiment 1: Acid application

The invention was first tested on photoresist wastewater. As noted above, this wastewater is generated in large quantities in the production of printed circuit boards. It is a polymer solution that is highly alkaline and typically contains levels of dissolved copper, tin, and lead. The presence of these metals precludes discharge of this wastewater directly to a POTW for BOD treatment, which is the most economical and environmentally sound method of disposal. Moreover, in many cases it is essential to remove the dissolved polymer photoresist as well before discharge into the POTW.

As indicated above, the usual method of treatment of waste water containing photoresist polymer and heavy metals includes a first step of addition of a detackifier. This is usually an aqueous aluminum salt product that produces an aluminum hydroxide floc when added to the alkaline photoresist. Acid is then added to lower the pH to less than 5.0 to make the polymer come out of solution, and form a floc. When acidified, carbon dioxide gas is emitted due to carbonates in the wastewater, causing foaming, which is undesirable. Finally, a metal precipitant is added. The result is a sludge containing the polymer, the precipitated metals, and aluminum. As presently practiced, a large amount of this sludge is precipitated per gallon of waste water (typically 10% by weight), leading to a substantial disposal problem.

Furthermore, there are few acceptable metal precipitants that can be added because of the acidity of the wastewater. At these low pH values, sulfide products, which are the metal precipitants of choice, are not without problems. More specifically, with the exception of the metal sulfide compositions of U.S. Pat. Nos. 5,451,327 and 5,372,726, all known inorganic sulfides produce large quantities of hydrogen sulfide gas, while organic sulfides may produce large quantities of carbon disulfide gas. These gases are highly toxic, and require extreme care in practice of the known processes using sulfide products.

The use of aluminum detackifiers also has several major drawbacks. First, these materials significantly re-dissolve at a pH of 5.0, so that the filtrate contains aluminum. Aluminum is sometimes a regulated metal, preventing discharge to the POTW. Furthermore, a voluminous floc containing large quantities of encapsulated water molecules is created when aluminum is first added to the wastewater. Therefore, it is slow to filter and produces large quantities of sludge that must normally be disposed of in landfills.

An exemplary process for using the method of the invention to process photoresist wastewater from circuit board manufacturing operations, in an "acid" embodiment to be employed when the photoresist polymer cannot be discharged to the POTW, is as follows:

The photoresist wastewater is first lowered to a pH of 5.0 with sulfuric acid (or another mineral acid), precipitating out the dissolved polymer. Ferrous sulfate, preferably in heptahydrate solid form (or any source of metal ions), is then added to the acidic wastewater. A dissolved form of the ferrous sulfate can be used but the solid ferrous sulfate dissolves easily and stays in the ferrous state because of the low acidity of the photoresist wastewater. The ferrous sulfate must stay in the ferrous state in order to react with the sulfide to form a ferrous sulfide precipitate. In some cases a source of trivalent ions (e.g., a source of ferric ions) can be provided to react with organic sulfides. A sulfide is then added; preferably this is an inorganic sulfide composition as disclosed in U.S. Pat. Nos. 5,451,327 and 5 5,372,726. The metals in the wastewater are precipitated as metal sulfides that detackify the polymer sludge. Water above the sludge can be decanted from the settling vessel in which the precipitation takes place. The amounts of ferrous sulfate and sulfides to be added varies with the specific wastewater to be treated and can be determined by experimentation. Dosages of 1,000–20,000 ppm are to be anticipated. However, these materials should be added in approximately stiochiometric amounts with respect to one another so as to minimize the discharge of excess sulfides or iron. The sludge is typically then filtered in a filter press to remove remaining water.

The process of the invention performs significantly better than the conventional aqueous aluminum salt treatments and commercial powder treatments, as shown by the data reproduced below.

This data refers to four samples of wastewater containing photoresist polymer and heavy metals, principally copper and lead, collected from four different circuit board manufacturing operations. All samples were treated by the "acid" Embodiment 1 process of the invention, employing solid ferrous sulfate heptahydrate and the sulfide compositions disclosed in U.S. Pat. No. 5,372,726.

Comparative tests were performed using the commercial "Dynachem" powder, and using aqueous liquid aluminum salt products sold for this purpose by Southern Water Treatment Company or A & T Chemical Company. The samples prepared using the liquid aluminum salt treatment were treated as prescribed by the product vendor. First, a quantity (usually about one gallon of product per 100 gallons of wastewater) of aqueous aluminum salt solution was added to the photoresist wastewater. The resulting solution was then lowered to a pH of 5.0 with sulfuric acid to precipitate the polymer. The treated wastewater was then filtered through a Whatman # 1 filter paper.

Similarly, the samples prepared using the commercial "Dynachem" powdered product were prepared according to the manufacturer's directions. A quantity of the product was first added to the photoresist wastewater. Then the pH was lowered to less than 5.0 to precipitate the polymer. This treatment is not usually used with a metal precipitant and therefore the filtrate would require further treatment in the traditional wastewater treatment system to remove the dissolved metals.

In the tests reported below, the time required to filter 200 ml of treated wastewater was measured and the amount of sludge collected was weighed.

The following test results were obtained:

|  | Dose Rate (ppm) | Filtration time (minutes) | Sludge quantity (grams) |
| --- | --- | --- | --- |
| Sample 1 |  |  |  |
| Commercial powder | 7,500 | 20.8 | 7.2 |
| Liquid aluminum salt | 10,000 | 18.3 | 5.1 |
| Inventive Process | 8,000 | 9.6 | 1.5 |
| Sample 2 |  |  |  |
| Commercial powder | 24,000 | 23.4 | 10.6 |
| Liquid aluminum salt | 10,000 | 11.6 | 10.5 |
| Inventive process | 11,250 | 5.4 | 7.5 |
| Sample 3 |  |  |  |
| Liquid aluminum salt | 25,000 | 10.3 | 5.5 |
| Inventive process | 11,250 | 7.3 | 5.9 |
| Sample 4 |  |  |  |
| Liquid aluminum salt | 10,000 | 35.1 | 15.3 |
| Inventive process | 2,250 | 27.3 | 10.1 |

In addition to the reduced filtration times and the reduced quantity of sludges produced shown in the data above, use of the inventive process produced the least foaming, and involved no hydrogen sulfide gas emissions.

It is clear from the above data that the process of the invention performs better than the traditional treatment methods. Use of the process of the invention produced less sludge, reduced filtration time, and generally required less product, providing a significant cost saving. This shows the commercial value of the invention.

It will be appreciated by those of skill in the art that it is known to add ferrous salts and sulfides to aqueous solutions to precipitate out heavy metals, as exemplified by the Anderson patent discussed above. However, insofar as the present inventor is aware, this is normally done at much lower dosage levels than indicated above. More specifically, the amount of metal salt typically added is insufficient to produce enough metal sulfide to detackify the sludge in the wastewater and to remove other dissolved heavy metals. The art generally suggests adding these materials in quantities only sufficient to precipitate the heavy metals, which is typically in the 100–500 ppm range. According to the present invention, the sulfides and ferrous ions are added at levels of 1000–20,000 ppm. The art does not suggest that thus increasing the dosages would result in a detackified, filterable sludge, as provided according to the invention. Furthermore, when the metal salt is slightly overdosed according to the invention, no excess sulfides are contained in the treated wastewater. Moreover, of course, the art does not suggest using the compositions shown in U.S. Pat. Nos. 5,451,327 or 5,372,726 as the sulfide in such processes.

A partial variant of the "acid" embodiment of the invention involve the use of photoresist "skins", which are formed on the surface of the photoresist bath when exposed to the air. These skins are normally disposed of separately as nonhazardous waste. However, the present inventor has discovered that when treated with concentrated acid, e.g., sulfuric acid, the skins become brittle and act as a natural detackifier for photoresist wastewater. Accordingly, if a quantity of an aqueous photoresist bath, having had skins formed thereon, is acidified to a pH less than 5.0, no further detackification may be required. However, the addition of a metal salt and a sulfide according to the invention may still be useful for removing metals, or if insufficient skins are available to complete the detackification.

Embodiment 2: Alkaline application

As noted above, under some circumstances it is permissible to discharge photoresist wastewater to the POTW if it will not exceed copper, lead or BOD limits; that is, the photoresist polymer itself is non-toxic and is degradable in biological treatment systems, so that some POTW systems would allow its discharge. However, this wastewater normally contains metal concentrations that would violate discharge limits. Therefore, the usual practice is to treat this waste, generating a large quantity of sludge. For every 100 pounds of wastewater treated, 5 to 10 pounds of sludge are typically generated. This sludge is usually considered a nonhazardous waste and is normally disposed in a Subtitle D landfill; it is never recycled.

It would be beneficial if this wastewater was treated to remove the metals and the resultant polymer solution sent to the POTW as a liquid wastewater. Doing so would have significant environmental and economic advantages, as the separated metals could then be recycled, and the polymer-containing water stream, being free of toxic metals, could be directed to the POTW for biological treatment and recycling. Furthermore, of course, significant amounts of sludge now disposed of in landfills would be eliminated.

At present, there is no effective alkaline treatment of this wastewater available; as the polymer in the wastewater prevents the coagulation of metal precipitates in an alkaline stream, the conventional practice is to acidify the wastewater to precipitate the polymer, followed by further treatment to detackify and remove the metals, as described above. It would be preferable to provide a method that would allow removal of the metals without prior removal of the polymer, followed by discharge of the polymer solution to the POTW.

Any method used to remove the copper and lead must produce a precipitate sized large enough that it can be adequately separated from the polymer solution by conventional filtration equipment. Tests on typical wastewaters using traditional sulfide treatment techniques failed to generate a filterable precipitate. However, using the combination of metal salts and sulfides according to the invention, as detailed below, it is possible to generate a filterable precipitate without first acidifying the wastewater to precipitate the polymer.

As discussed above, according to the invention, a sulfide composition, preferably as disclosed in U.S. Pat. Nos. 5,451,327 and 5,372,726, is first added to a quantity of the waste water to be treated, followed by addition of a ferrous salt;

again, a solid ferrous sulfate heptahydrate is suitable. Such wastewaters are typically of neutral to alkaline pH, i.e., of pH>5.0. As in this process the water to be treated need not be acidified to cause the polymer to precipitate, lesser quantities of these compositions need be used; 100–2,000 ppm are anticipated dosages. The metal/ferrous sulfide precipitate settles to the bottom of the treatment tank, typically within about eight hours. (Centrifugation may be performed if faster precipitation is required.) After the metal precipitate has settled out, the uppermost layer of cleaned polymer solution can be decanted and discharged to the POTW. The concentrated sludge at the bottom of the tank is allowed to remain in the tank and a new charge of photoresist wastewater added for treatment. This process is repeated until there is no longer any space left in the tank for decantation. Then the waste sludge is acidified to remove any remaining polymer and treated in the customary manner of Embodiment 1. This process reduces the amount of sludge generated by about 90%, reduces the cost of the acid required, and eliminates the need for aluminum based detackifiers. The processes described above are not limited by the specific order of addition of the ferrous salts and sulfides to be effective. However, it presently appears best to add the sulfide first and the metal salt last.

In the alkaline Embodiment 2, filtration of the wastewater through a filter press to remove the precipitated metals is possible if the treated wastewater is first diluted. An undiluted 200-ml. sample of photoresist wastewater was treated according to the process of the invention and vacuum filtered through a Whatman #1 filter paper. The filtration time was more than 30 minutes. When one part of photoresist wastewater treated according to the process of Embodiment 2 was diluted with four parts of water, the resulting solution was easy to filter and vacuum filtered through a Whatman #1 filter paper in less than 10 seconds. Treated wastewater can be used to dilute the treated photoresist wastewater. The step of dilution can also be used to separate any metal precipitate particles from photoresist-containing wastewater by conventional solid separation equipment and methods, such as filtering using a filter press, or decantation.

The following data illustrates the advantage of less sulfide product required, and less sludge produced by the alkaline Embodiment 2, as compared to the acidified Embodiment 1 process discussed above, carried out on identical samples.

|  | Dose Rate (ppm) | Sludge Weight (gm) |
| --- | --- | --- |
| Embodiment 1 | 11,250 | 7.3 |
| Embodiment 2 | 1,000 | 0.8 |

As noted above, aqueous paint wastes, especially wastewater from the spraying of solvent-based paints, require detackification to prevent operational problems; as these paint wastes are sticky and adhere to pipes, tanks, and pumps, they must be detackified before metals can be removed and the water stream filtered and discharged. Wastewater streams from paint spray booth operations can be treated according to either embodiment of the process of the invention, as can other wastewater streams of similar characteristics.

More particularly, paint wastes often contain dissolved metals. These metals come from corrosion inhibitors such as zinc, lead, nickel, or chromium. Other metals are found in the pigments used in the paints. Before these treated wastewaters can be discharged, it is normally necessary to remove metals to meet discharge limits. This can be done by the process of the invention in either Embodiment 1 (acid application) or Embodiment 2 (alkaline application) thereof. The embodiment selected depends upon other treatment factors. For example, if the wastewater contains emulsified oils and an acid break is needed, then Embodiment 1 of the invention is used. If the wastewater contains zinc, nickel, or other alkaline-precipitated metals, then Embodiment 2 of the invention is used; this has the further advantage that the treated spray booth wastewater is non-corrosive. Either method will usually produce a treated wastewater that is clear, colorless, and free of oil and dissolved heavy metals.

The invention is also applicable to treatment of other aqueous solutions having similar characteristics.

While several preferred embodiments of the invention have been described, the invention is not to be limited thereby, but only by the following claims.

What I claim as my invention is:

1. A method for treating a quantity of wastewater comprising dissolved heavy metals and photoresist polymer, paint waste, or other constituents that if untreated would render said wastewater unfilterable, to produce a sludge containing at least said dissolved heavy metals and detackified solids that can be filtered from said quantity of wastewater, comprising the steps of:

acidifying said wastewater as needed to reach a pH of no more than about 5.0, so as to precipitate out photoresist polymer, paint waste, or other constituents that if untreated would render said wastewater unfilterable;

adding an iron salt and a sulfide reacting product to said wastewater at a dosage of at least about 1,000 ppm to precipitate a sludge comprising iron sulfides, sulfides of said heavy metals, and detackified solids; and filtering the sludge from the wastewater.

2. The method of claim 1, wherein said sulfide reacting product can be either organic or inorganic in nature.

3. The method of claim 1, wherein said iron salt can be either organic or inorganic in nature.

4. The method of claim 1, wherein said sulfide reacting product can be added either as a solid material or a liquid reagent.

5. The method of claim 1, wherein said iron salt can be added either as a solid material or a liquid reagent.

6. The method of claim 1, wherein said wastewater contains photoresist polymer, and wherein photoresist skins are permitted to form on the surface of said photoresist-containing wastewater before acidification, whereby said photoresist skins act as a detackifier.

7. The method of claim 1, wherein a quantity of treated water is contained in a vessel, such that said sludge is precipitated to the bottom of said vessel, and comprising the further step of decanting water from above the sludge.

8. The method of claim 7, comprising the further step of adding water to said vessel, so as to dilute said sludge, and filtering the diluted sludge.

9. The method of claim 1, comprising the further step of centrifugation to separate the precipitated sludge from the water.

10. A method for treating a quantity of wastewater comprising dissolved heavy metals and photoresist polymer, paint waste, or other constituents that if untreated would render said wastewater unfilterable, to produce a sludge containing said dissolved heavy metals capable of being filtered from said quantity of wastewater, comprising the steps of:

controlling the pH of said wastewater as needed to reach a pH greater than 5.0, so as to prevent precipitation of said photoresist polymer, paint waste, or other constituents that if untreated would render said wastewater unfilterable;

adding an iron salt and a sulfide reacting product to said wastewater at a dosage of between about 100 and about 2,000 ppm, to precipitate a sludge comprising iron sulfides, sulfides of said heavy metals, and detackified solids;

decanting the wastewater containing said photoresist polymer, paint waste, or other constituents that if untreated would render said wastewater unfilterable from above said sludge; and filtering the sludge from the remaining wastewater.

11. The method of claim 10, wherein said sulfide reacting product can be either organic or inorganic in nature.

12. The method of claim 10, wherein said iron salt can be either organic or inorganic in nature.

13. The method of claim 10, wherein said sulfide reacting product can be added either as a solid material or a liquid reagent.

14. The method of claim 10, wherein said iron salt can be added either as a solid material or a liquid reagent.

15. The method of claim 10, comprising the further step of adding water to said vessel, diluting the sludge, before filtering the diluted sludge.

16. The method of claim 10, comprising the further step of centrifugation to separate the precipitated sludge from the water.

* * * * *